US007229353B2

(12) United States Patent
Seelig

(10) Patent No.: US 7,229,353 B2
(45) Date of Patent: Jun. 12, 2007

(54) METHOD AND APPARATUS FOR CASHLESS GAMING

(75) Inventor: Jerald C. Seelig, Absecon, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 888 days.

(21) Appl. No.: 10/613,878

(22) Filed: Jul. 2, 2003

(65) Prior Publication Data

US 2005/0003887 A1 Jan. 6, 2005

(51) Int. Cl.
*A63F 9/24* (2006.01)
*G06K 19/00* (2006.01)

(52) U.S. Cl. ............................ 463/25; 463/16; 463/12; 463/13; 463/20; 235/375; 235/380; 235/487

(58) Field of Classification Search ............ 463/12–13, 463/16–20, 25–30, 40–43; 273/143 R, 292, 273/293, 309, 138.1, 269; 235/375, 380, 235/382, 487, 492; 700/91–93
See application file for complete search history.

(56) References Cited

U.S. PATENT DOCUMENTS

| | | | |
|---|---|---|---|
| 5,129,652 | A | 7/1992 | Wilkinson |
| 5,321,241 | A | 6/1994 | Craine |
| 5,811,772 | A | 9/1998 | Lucero |
| 5,820,459 | A | 10/1998 | Acres et al. |
| 5,909,486 | A | 6/1999 | Walker et al. |
| 5,959,277 | A | 9/1999 | Lucero |
| 6,012,832 | A | 1/2000 | Saunders et al. |
| 6,222,914 | B1 | 4/2001 | McMullin |
| 6,227,972 | B1 | 5/2001 | Walker et al. |
| 6,244,958 | B1 | 6/2001 | Acres |
| 6,257,981 | B1 | 7/2001 | Acres et al. |
| 6,379,247 | B1 | 4/2002 | Walker et al. |
| 6,394,907 | B1 | 5/2002 | Rowe |
| 2001/0031664 | A1 | 10/2001 | Acres |
| 2001/0044337 | A1 | 11/2001 | Rowe et al. |
| 2002/0002075 | A1 | 1/2002 | Rowe |
| 2002/0029339 | A1 | 3/2002 | Rowe |
| 2002/0039921 | A1 | 4/2002 | Rowe et al. |
| 2002/0042300 | A2 | 4/2002 | Acres |
| 2002/0077178 | A1 | 6/2002 | Oberberger et al. |
| 2002/0098888 | A1 | 7/2002 | Rowe et al. |
| 2002/0103027 | A1 | 8/2002 | Rowe et al. |
| 2002/0107065 | A1 | 8/2002 | Rowe |

(Continued)

*Primary Examiner*—Mark Sager
(74) *Attorney, Agent, or Firm*—Ian F. Burns

(57) ABSTRACT

A method for enhancing cashless gaming. Preferably, game player is provided with an incentive to redeem winnings on a cashless device. The method preferably includes providing a wagering game to a player, allowing the player to transfer value to the wagering game, recording the amount transferred, allowing the player to make a wager, presenting a game to the player, determining whether the game outcome is a wining or losing outcome, updating the amount recorded, allowing the player to cash-out at least a portion of the recorded value, and triggering an award event if the cash-out is made using a cashless device. In one embodiment, the player is given an award when the value redeemed exceeds a predetermined qualifying amount.

Also provided is a system for allowing a player to redeem winnings, including a gaming machine with a processing system, a cashless gaming device, and a cashless device cash-out system.

55 Claims, 4 Drawing Sheets

U.S. PATENT DOCUMENTS

2002/0137217 A1 9/2002 Rowe
2002/0138594 A1 9/2002 Rowe
2002/0142825 A1 10/2002 Lark et al.
2002/0151359 A1 10/2002 Rowe
2002/0155887 A1 10/2002 Criss-Puszkiewicz et al.

METHOD AND APPARATUS FOR CASHLESS GAMING

BACKGROUND OF THE INVENTION

1. Field of the Invention

The present invention relates to a method and apparatus for encouraging players to use cashless gaming devices and systems.

2. Background

Gaming devices, such as slot machines and video poker machines, were originally designed only to accept and dispense coins. This restriction is unsatisfactory for both players and for gaming proprietors. Players are unsatisfied because they are forced to carry around large quantities of heavy coins. Furthermore, players are unable to interchangeably use coins in machines designed for wagers of different denominations. For example, dollar tokens cannot be used in nickel machines and vice versa. Therefore, a player either has to carry around multiple denominations of coins or is forced to go to a cashier cage or casino attendant in order to change coins to a desired denomination. This inconvenience detracts from the player's gaming experience.

The restriction to coins is also unsatisfactory to gaming proprietors. Apart from providing their patrons with a sub-optimal experience, the use of coins creates added expense and inconvenience for gaming proprietors. For instance, gaming proprietors might be required to utilize additional personnel in order to conduct coin based transactions with patrons. Gaming proprietors are also forced to deal with the logistics of maintaining sufficient amounts of various coins, including an increased security risk to gaming employees and patrons from maintaining large amounts of currency on the gaming premises.

Coins also create increased maintenance costs and machine down-time. For example, when coins are used, attendants must collect excess coins from machines and must fill the coin hoppers when the machines begin to run low on coins. Coins also cause wear and tear on the internal components of the gaming machines, resulting in malfunctions and broken machines. Coins generate metallic dust that can cause the machines to break and malfunction. Coins often become jammed in the coin transport mechanisms, requiring maintenance.

The introduction of paper currency acceptors and validators addressed some of the problems discussed above. In particular, game players are able to play games of different wager amounts by inserting paper currency into the machine. Therefore, to some extent, the player is no longer required to carry around coins of different denominations.

However, other problems were not solved by paper currency acceptors. For example, even though the gaming machines might accept paper currency, they still dispense winnings in the form of coins. Once a player stops playing the game and "cashes-out" his or her winnings, the player is not be able to use the coins in machines designed for different denominations of coins or tokens. The player still has to visit a cashier cage or attendant in order to change coin types or obtain paper currency. Paper currency acceptors also have not solved the problems of filling and removing currency from the machines and maintenance resulting from wear and tear on the machines caused by the coin handling functions. In fact, the paper currency acceptor and transport mechanisms have additional items that require maintenance and service.

The introduction of non-currency methods, such as tickets, vouchers, smart cards, credit cards, and other credit based transactions (generally, "cashless methods") has allowed many of the previously described problems to be solved, or at least mitigated. For example, when cashless methods are used, players are able to use their cashless device on machines programmed to wager any denomination.

By using cashless devices, the customer must no longer tote around coins or currency. A player's winnings or losses can be added or subtracted from the value stored in the cashless device. The customer no longer has to worry about exchanging various denominations of currency.

Cashless devices increase the security and safety of the gaming environment. Cashless devices allow the gaming proprietor to reduce the amount of currency on site, reducing the potential for criminal activity. Cashless devices can be tied to a specific person's identity, reducing the chance for theft. For example, a gaming proprietor can require a patron to provide identification before cashing out a cashless device. Similarly, if a patron reported a cashless device as lost or stolen, the gaming proprietor may cancel the missing cashless device and issue the patron a new device.

However, there are problems associated with the use of cashless devices. For example, many game players are unfamiliar with the use of cashless devices and prefer to use currency. Many players are reluctant to try cashless devices because they are not familiar with them. What has long been needed is a means for providing players with an incentive to use cashless devices so that both gaming proprietors and game players can experience the full benefits of the use of cashless devices.

In addition, it would be beneficial to provide players with an incentive to cash-out cashless devices only when a player has accumulated a desired value. This would encourage players to play longer, which would benefit the gaming proprietors by increasing revenue.

SUMMARY OF AT LEAST ONE EMBODIMENT OF THE INVENTION

Advantages of One or More Embodiments of the Present Invention

The various embodiments of the present invention may, but do not necessarily, achieve one or more of the following advantages:

encourage game players to use cashless devices;

discourage game players from cashing out before they have accumulated a desired value;

reduce the number of cash/cashless device transactions between game players and gaming employees, such as attendants and cashiers;

encourage game play by providing game players with an incentive to obtain a cashless device with a certain value;

reduce maintenance and servicing of gaming devices;

require less cash on the gaming premises; and encourage cash-outs on cashless devices rather than for currency or currency equivalents.

These and other advantages may be realized by reference to the remaining portions of the specification, claims, and abstract.

Brief Description of at Least One Embodiment of the Present Invention

In one embodiment, the Applicants have provided a method that may encourage the use of cashless devices in games, such as wagering games. In one embodiment, a player is provided with at least one gaming device capable of presenting a game to a player. The gaming device is also capable of recording the value of a cashless device. The value of the cashless device is recorded and the player is permitted to play the gaming device. The game player is permitted to redeem at least a portion of the value of the cashless device. If the value redeemed exceeds a predetermined qualifying amount, the player is awarded an additional prize.

In another embodiment, a method is providing for providing a gaming player an incentive to redeem winnings on a cashless device. The player is provided with a wagering game and allowed to transfer value to the wagering game. A game is presented to the player and the player makes a wager. The game is initiated and it is determined whether the game outcome is a winning or losing event. The recorded value is updated by adding or subtracting value from the recorded value depending on whether the result of the game is a winning or losing event. The player is allowed to cash-out at least a portion of the updated value. An award event is triggered if the cash-out is made using a cashless device. The award event awards the player a prize.

In another embodiment of their invention, Applicants have provided a system for allowing a gaming player to redeem winnings. The system includes a gaming machine. The gaming machine includes a value acceptor configured to accept currency or currency equivalents from the game player. The gaming machine also includes a processing system. The processing system is configured to present the player with a game of chance and to determine whether the player has won or lost a particular game. The processor is configured to store the value accepted from the game player and to update the value according to whether the player has won or lost the game of chance.

The system also includes a cashless gaming device. The system includes a cashless gaming device cash-out system that is in communication with the gaming machine processing system. The cashless gaming device cash-out system includes a processor that is configured to compare information from the gaming machine processor to a set of predefined instructions in order to determine whether the game player is entitled to a prize. The cash-out system also includes a value dispenser configured to dispense at least a portion of the value stored in the processing system to the game player.

In another embodiment, the Inventor has provided an apparatus for awarding a gaming player a reward for redeeming winnings without using a game based coin dispenser. The apparatus includes a processor for reading information transferred from a cashless gaming device. The processor compares the information to a set of pre-set instructions to determine whether an additional prize should be awarded to a player. The pre-set instructions are contained in firmware or software. The apparatus also includes a cashless device reader for reading information from a cashless device and inputting the information into the processor. The apparatus includes player account information storage. The player account information stores player information and is in communication with the processor.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF AT LEAST ONE EMBODIMENT OF THE PRESENT INVENTION

Figure 1:
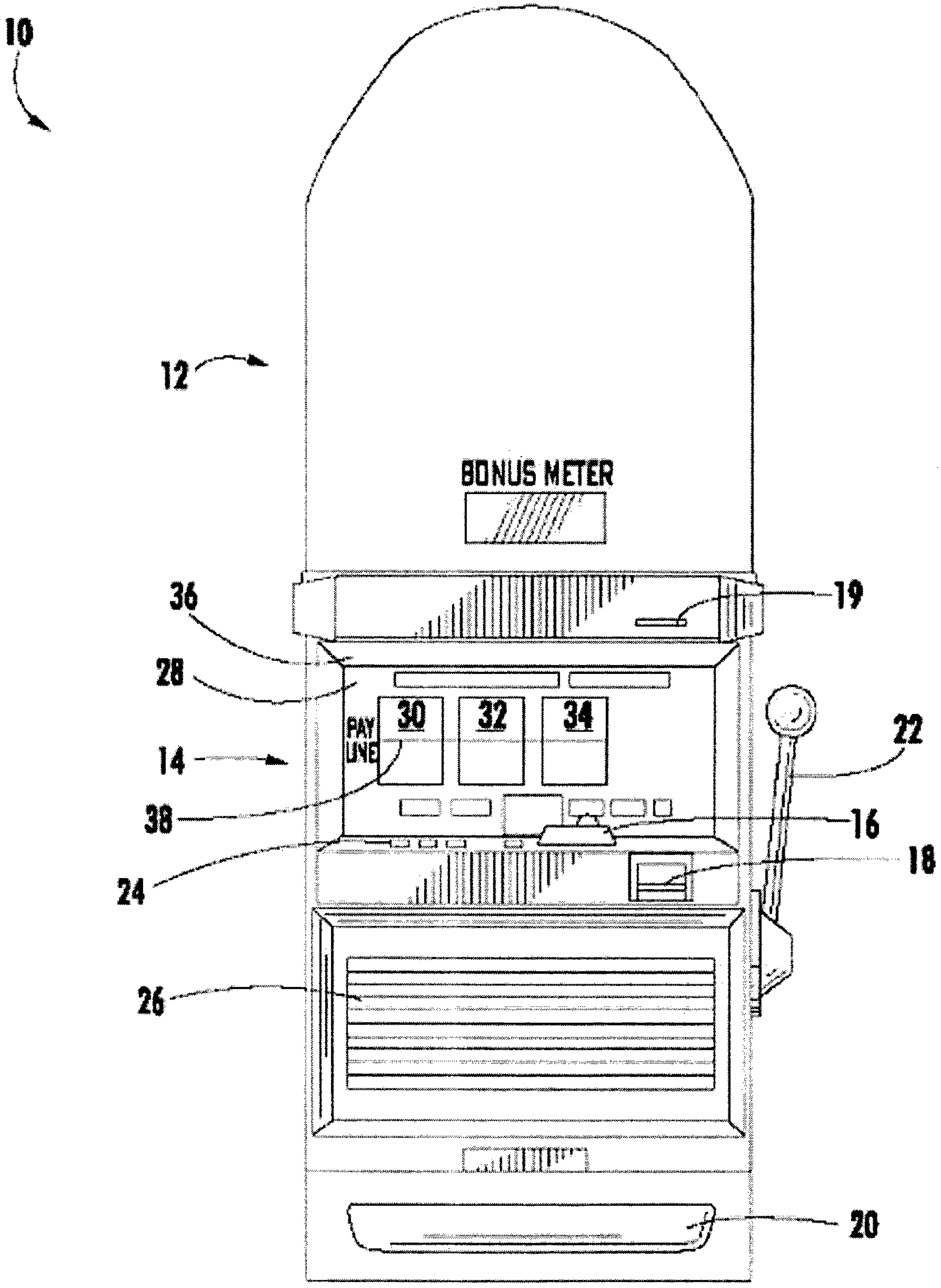
FIG. 1 is substantially a front view of a gaming device for use with the present invention.

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

The present invention relates, generally, to methods of encouraging the use of cashless gaming devices, such as vouchers, coupons, tickets, stubs, certificates, memory storage devices, and cards. A cashless device is meant to be anything that can be assigned or communicate a particular value. For example, one cashless device may be a voucher. The voucher can be issued with a specific value. Preferably, the value associated with the voucher can be updated by recording (e.g., by printing) a new value on the voucher when a player chooses to cash out from a particular gaming device.

Another cashless device is a player card that can be linked to a cash or credit account, such that player's winnings or losses can be credited to or debited from the account. Preferably, the gaming machine has a reader that gathers account identifying information in the card, queries a central computer or accesses a computer network, and receives information about the player's cash or credit account.

Cashless devices are preferably capable of having a variable value. One way this can be achieved is by imprinting a unique code or identifier on the cashless device. This code could be, for example, a bar code or could be encoded on a magnetic strip, such as those used on credit cards. The identifier is preferably associated with a database that stores information about the cashless device and a player account. The information stored can include many different things, but preferably includes player information and a credit and/or cash account balance. Preferably, the balance stored in the database can be modified. For example, the balance may be updated when a player wins or loses credits, pays additional currency to be converted to credits, or decides to cash out all or part of the value of the cashless device.

Cashless devices can also contain, or be linked to, a player tracking system. Player tracking systems are often used by gaming proprietors to track a player's wagering habits, and to award "comps" such as room upgrades, free meals, show tickets, etc. The information recorded might include the kind of games the player has played, how often the player visits the establishment, the amount won or lost by the player, the amount of time spent playing games of chance, etc. As will be discussed below, this player tracking information (or "player characteristics") can be used to determine when a player will be given an incentive to cash-out and to determine the nature of and/or odds of receiving the incentive award.

The methods, processes, and apparatus of the present invention can be used with many different types of gaming machines, including wagering devices such as slot machines, video poker machines, and the like. One example of a suitable gaming device is the slot machine illustrated in FIG. 1.

As seen in FIG. 1, the present invention comprises a gaming apparatus, generally indicated by reference number 10. In one preferred embodiment, gaming apparatus 10 comprises a prize display 12 and a gaming device 14. Gaming device 14 may be any of a large number of devices that are adapted to allow players to play a game, such as gaming devices typically found in arcade and casino environments, including arcade games, video games, gambling machines, video poker machines, slot machines, etc. In the most preferred embodiment, gaming device 14 is further adapted to allow a player to place a wager and play a game, such as a slot machine.

Gaming device 14 may include a wager acceptor for accepting wagers, such as a coin slot 16, a device 19 capable of reading and/or dispensing cashless devices. Gaming device 14 may also include a device 18 for accepting paper currency. In addition, a payout mechanism (not shown) and a coin receptacle 20 may be provided for awarding prizes or for dispensing wagers to players cashing out and retiring from a game. A printer may also be provided for printing out cashless vouchers. A handle 22 and a button 24 may be provided for activating gaming device 14 to begin a game. A pay table 26 may further be provided to allow a player to see what symbol or combination of symbols provide a winning event. In at least one preferred embodiment, gaming device 14 may be an S Plus model gaming device manufactured by International Game Technology in Reno, Nev.

Gaming device 14 may further include a gaming outcome display 28 preferably positioned so that a player (not shown) playing gaming device 14 can see the display 28. Game outcome display 28 may utilize physical game reels 30, 32, and 34. Game reels 30, 32, and 34 may be attached to a drive mechanism (not shown) of gaming device 14 to rotate the reels in a manner well known in the art. Each game reel 30, 32, and 34 preferably has a plurality of symbols (not shown) positioned on the circumference of each game reel 30, 32, and 34. Game reels 30, 32, and 34 may be positioned side-by-side with coincident axes of rotation and a portion of their individual circumferences facing outward from gaming device 14.

A panel 36 preferably covers game reels 30, 32, and 34 such that only a portion of their individual circumferences is shown to the player. At least one symbol from any of game reels 30, 32, and 34 may be used to display a game outcome. At least one pay line 38 may be provided for the player to use in determining a game outcome based on the symbol or a combination of symbols positioned thereon. In an alternative embodiment, gaming outcome display 28 utilizes a video display (not shown) displaying images of game reels and images of at least one pay line. A video display may also display game symbols in many other formats and arrangements, such as playing cards.

Gaming apparatus 10 further has a prize display 12 configured to display at least one game and prize to a player. Prize display 12 is most preferably configured to display a bonus game and at least one bonus prize to the player. In other embodiments, prize display 12 may provide a primary game. Alternatively, prize display 12 may be a stand-alone device allowing a player to place a wager and play a game.

In the preferred embodiment, prize display 12 is attached to gaming device 14 and positioned on top of gaming device 14. In other embodiments (not shown), prize display 12 may be separate from gaming device 14 but in communication with gaming device 14. In this embodiment, prize display 12 may be in communication with a plurality of different gaming devices 14 via a computer network in a manner that is well know in the art. Prize display 12 may be positioned adjacent to or remote from gaming device 14. In other embodiments, prize display 12 is a stand-alone display not in communication with gaming device 14 and it may be capable of independently accepting wagers and awarding prizes to a player.

Two categories of cash-outs are particularly relevant to the invention. Cash-outs can occur when a player obtains, removes, or modifies a cashless device from a gaming apparatus. Another type of cash-out occurs when a player converts the value of a cashless device into currency or currency equivalents, such as credit on a credit card or to a bank account. For example, a player might choose to convert credits on a casino account to cash. It should be recognized that these two different types of cash-outs differ in their value to the gaming operator and differ in how the operator may choose to implement them.

In general, cash-outs occur where the player obtains credit or currency are less desirable for the gaming operator than cash-outs where the value remains on a cashless device. Cash-outs for currency or credit are likely to require more personnel to make the required credit transfer or to provide currency to the player. Also, if the player is obtaining currency or credit, the player is less likely to continue to use that value to play wagering games. Therefore, it may be desirable for the gaming operator to encourage players to wait until their cashless device reaches a set value before they cash-out.

Cash-outs for currency also are likely to involve more maintenance, service, inconvenience and wear and tear on machines than cash-outs where the value remains on the cashless device. For example, when cash-outs for currency occur at a gaming machine, the currency dispensed causes wear on the machine components. As discussed above, currency dispensers also require service and maintenance. Whether a machine or cashier makes a currency cash-out, the gaming operator is required to maintain greater cash reserves on the premises and consequently is likely to require more security.

As was previously discussed, many gaming machines and devices are presently designed to accept and dispense both currency and cashless devices (such as player tracking cards, smart cards, credit cards, vouchers, tickets, etc.). The present invention encourages players to cash-out using cashless transactions. Preferably, the player is provided with an incentive to cash-out using a cashless device when the value cashed out is above a certain threshold.

Preferably, a player is encouraged to cash-out on a cashless device by providing the player an opportunity to win an award in return for using the cashless device. However, if the player is given a chance to win an award every time a cashless device is used for a cash-out, the player may simply cash-out small values in order to have a chance at winning a prize. The gaming operator may choose to set a threshold, or qualifying amount, of money that must be cashed-out in order to receive an award or a chance at an award. The operator could base this qualifying amount on any number of things.

For example, the operator may choose to allow a player to be awarded a prize, or a chance at a prize, merely for cashing-out using a cashless device. Alternatively, the operator might choose to provide the incentive to customers who cash-out winnings over a certain amount. In this embodiment, the operator could protect against players repeatedly cashing-in and cashing-out, without actually playing the wagering games. Similarly, the operator could tie the qualifying event to the amount wagered by the player, or the amount lost by the player.

For example, a qualifying cash-out could be based, not on the exact amount cashed out, but on the amount wagered. For example, a player might insert a cashless device with a value of $500. The player might play the wagering game for an hour, place an aggregate wager of $300, and have a cash-out balance of $400. The gaming operator could base the qualifying award on the $300 wagered, the $100 lost by the player, the cash-out value of $400, or on a combination of these values.

A variation of this would be to, in place of or in addition to correlating the qualifying event to the winnings cashed-out, correlate the qualifying event to the amount of time spent playing a particular game of chance. The operator might choose to make a certain percentage of a cashless device's value available for a qualifying event for a particular duration of game play. For example, the operator might make 15% of the cashless device's value available for every 15 minutes of game play. In the above example, this would mean that the cash-out value for award purposes would be 60% of the cashless device's value.

The qualifying events could also be subject to limitations. For example, a particular type of qualifying event could be subject to certain maximums. A particular qualifying event might be limited to a set number of times per day or per hour. These limitations could be tailored according to the value of the incentive and/or the operator's desire to provide the incentive. For example, higher value and/or higher odds awards might be subject to more stringent limitations than lower value/odds awards. Similarly, if the operator wants to provide a stronger incentive for a particular type of qualifying event, the operator might choose to impose less stringent limitations, or increase the value of the award.

Those of skill in the art will recognize that the nature of the qualifying event can be any of the above embodiments, or additional embodiments within the skill of the person of ordinary skill in the art. Combinations of qualifying events could also be used. Those of skill in the art will also recognize that multiple qualifying events could be used simultaneously, potentially with different incentives, and that the nature of the qualifying event can vary with the incentive awarded, as will be discussed infra.

The incentive provided to the player can take many forms. One incentive might be awarding a player an additional amount of currency/credit. In this embodiment, a player's decision to cash-out perhaps an amount over a threshold level) triggers a random number generator. The random number generator preferably indicates an additional award to which the player is entitled. For example, the random number generator could determine a completely random amount of money (perhaps within a fixed range) to be added to the player's winnings. Alternatively, the amount awarded could be a random, progressive, or fixed percentage (or multiple) of the amount cashed-out. The amount awarded could be correlated to other factors, such as a player rating maintained on the player based on the player's wagering frequency and amounts (such as those currently employed by casinos for awarding comps).

In addition to being awarded additional credits or currency, a player could be awarded goods, merchandise, or services for qualifying cash-outs. For example, a player might be awarded a free meal, a room upgrade, or prizes such as jewelry, vacations, automobiles, and other goods of varying value. The prize could be entry into a gaming competition, such as a slot tournament. Anything having a value may be suitable for use as a prize. The value of the good and/or service awarded could be correlated to factors such as the player's rating or the amount cashed-out.

Rather than automatically receiving some prize for qualifying cash-outs, a player could be awarded a chance at being awarded a prize. The player's decision to initiate a qualifying cash-out event could trigger a random number generator. The random number generator can be used to determine whether a winning event has occurred. If a winning event has occurred, the player can either be awarded a predefined prize of a predefined value, a predefined prize having a randomly determined value, a predefined prize having a value correlated to some other variable, or the player could be randomly awarded a prize having a fixed or randomly determined value.

Rather than generating a random number immediately when a player cashes-out a qualifying amount, a player could be given a chance to play another game or machine and have a chance at winning a prize. For example, when a player made a qualifying cash-out, he or she could be awarded a voucher that could be used to activate a gaming device, such as a slot machine or game wheel, that is designed to award, and perhaps dispense, additional prizes. Also, the player could be awarded free play on the gaming device the player cashed-out from as a reward for making a qualifying cash-out.

As was mentioned above, those of skill in the art will recognize that the qualifying event can be tailored to the nature of the incentive. In addition, it will be recognized that multiple incentives, potentially having different qualifying events, can be used. For example, it may be beneficial to encourage all players to use cashless devices. Accordingly, the operator might provide an incentive that is available for all players for all cash-outs on cashless devices. In this embodiment, the operator might choose to have the award be of relatively low value and/or relatively low odds of winning. This would tend to discourage players from engaging in repeated cash-out transactions merely to obtain a prize or increase their chances of winning a prize.

For other cash-out qualifying events, such as when a player has wagered a large amount or played a game for a long period of time, the operator might want to provide a greater incentive to use the cashless device. In this case the operator might want to increase the value of the incentive and/or increase the odds of obtaining the prize.

Those of skill in the art that the above described incentives and incentive trigger events can be used for both cash-outs on cashless devices and for cash-outs for currency. Incentives can be provided so that players are discouraged from cashing-out for currency until the incentive condition has been reached. Again, the incentive condition can be any of the above described incentive conditions including, without limitation, threshold cash-out amounts, wagering thresholds, and game play duration threshold.

Description of a Method of Operation of an Embodiment of the Invention

Figure 2:
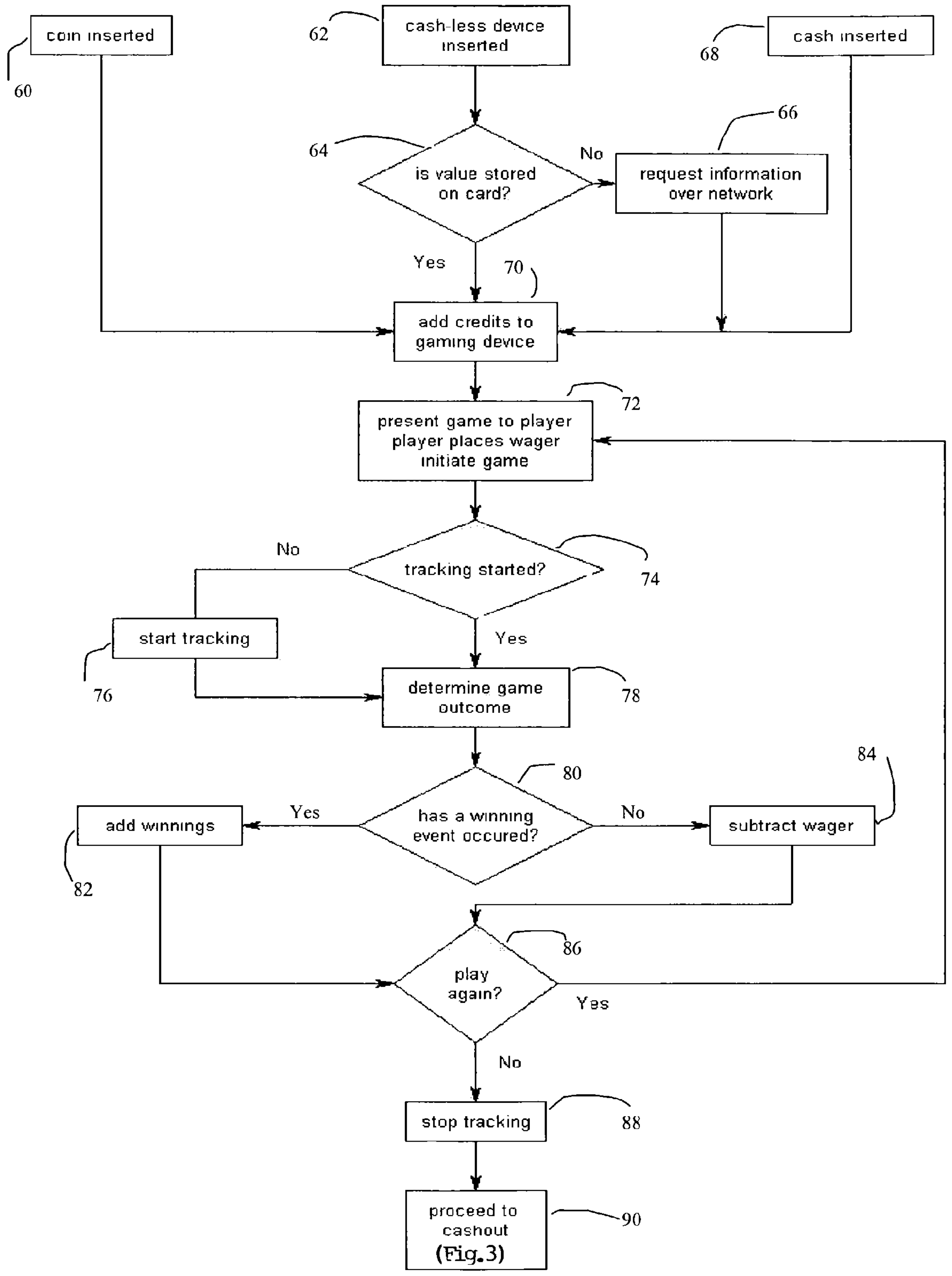
FIG. 2 is substantially a flow chart illustrating the operation of a method of an embodiment of the present invention.
Figure 3:
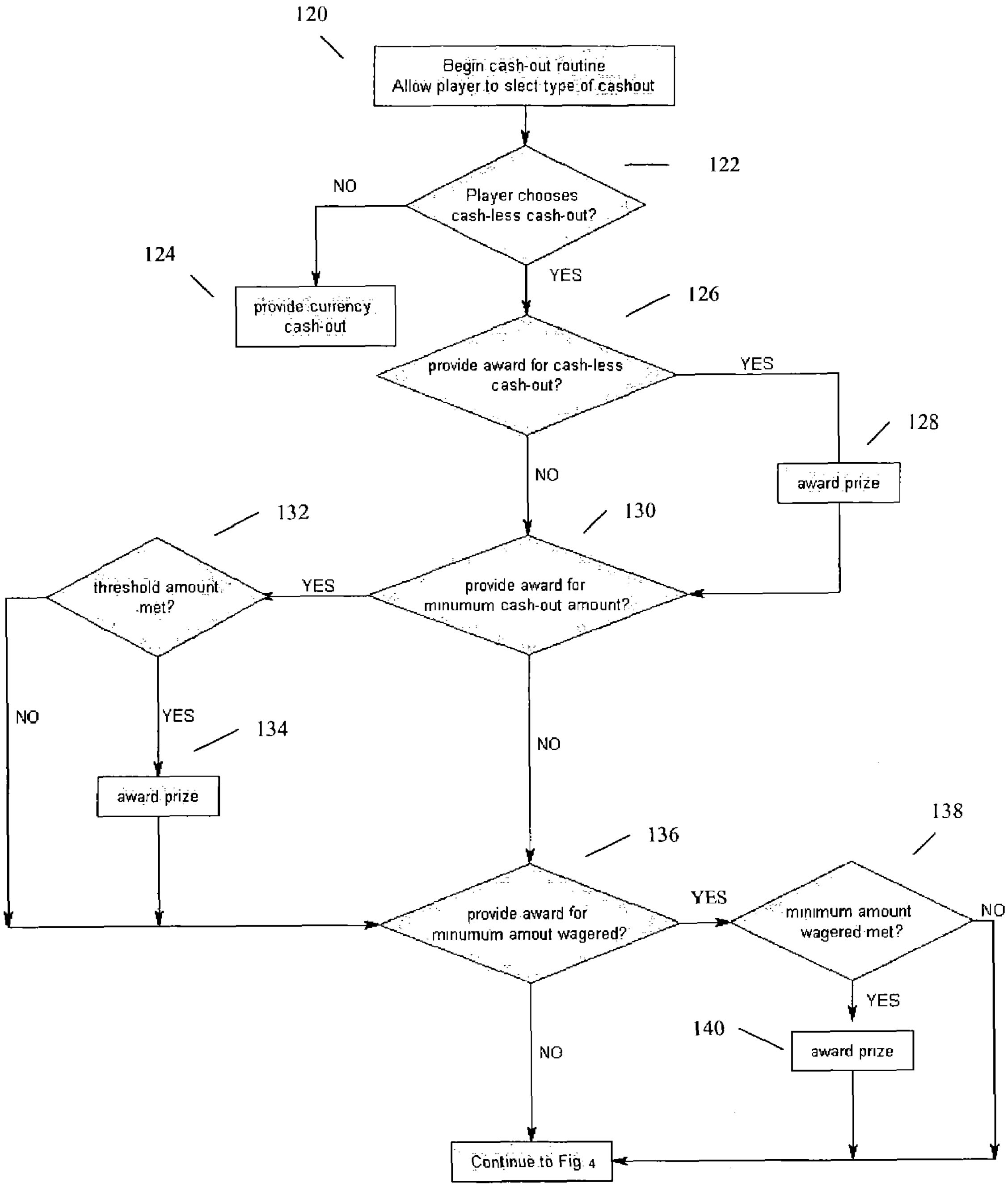
FIG. 3 is substantially a flow chart illustrating the operation of a method of an embodiment of the present invention.
Figure 4:
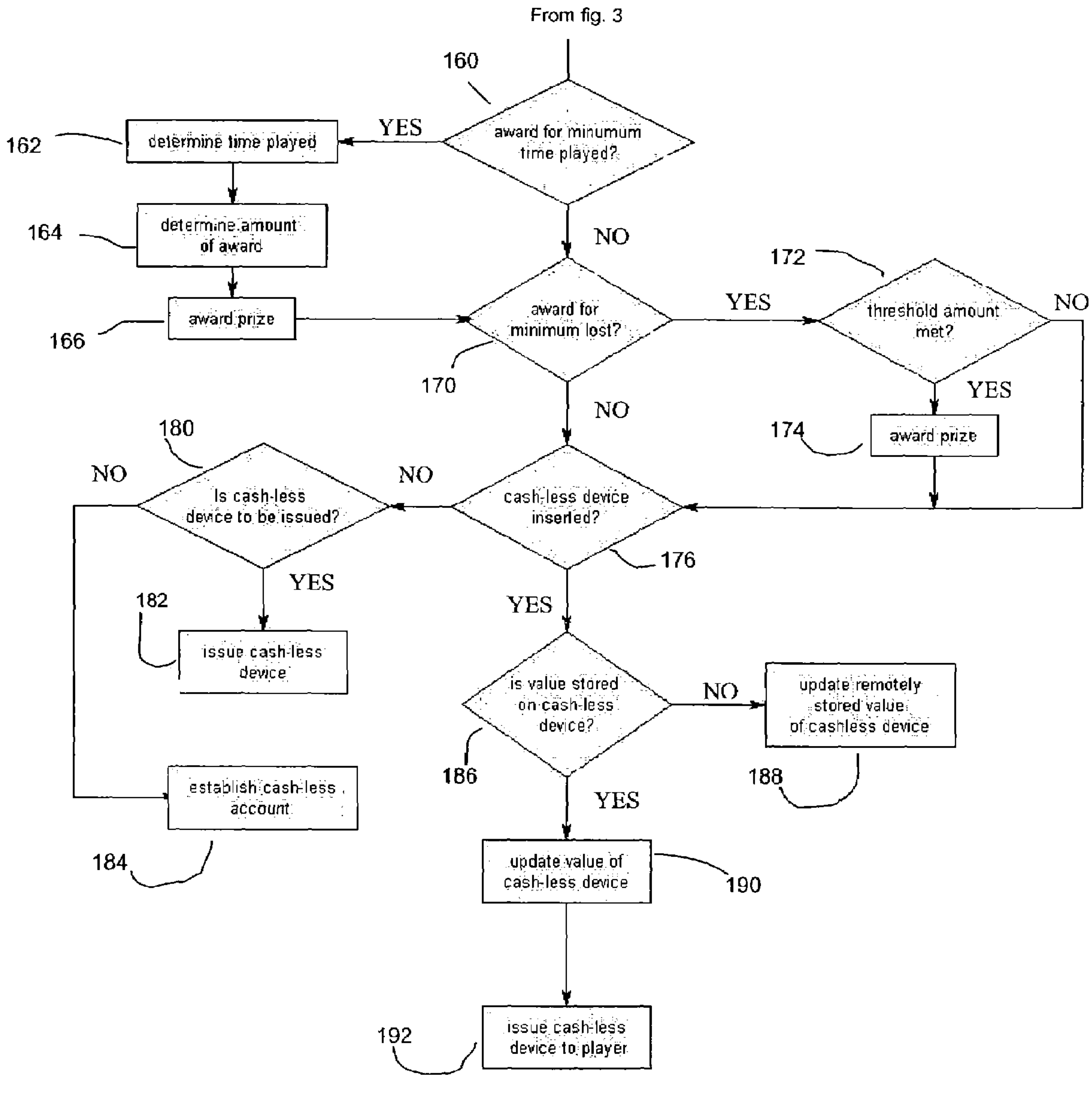
FIG. 4 is substantially a flow chart illustrating the operation of a method of an embodiment of the present invention.

FIGS. 2–4 illustrate the operation of an embodiment of the invention. With reference to FIG. 2, a gaming device is provided to a player, who may initiate a game by inserting value into the gaming device. The player may insert value by inserting coins in step 60, inserting cash in step 68, or inserting a cashless device in step 62. If coins 60 or cash 68 are inserted, the value of the currency is added to the players gaming credits at step 70.

If a cashless device is inserted at step 62, the next step depends on whether the value of the cashless device is stored on the device itself, or if the value is stored remotely. If decision 64 determines that the value is stored on the card, the value of the card is added to the player's game credits on the gaming device at step 70. If decision 64 determines that the value of the card is stored remotely, the gaming device requests information about the gaming device over the remote network in step 66. Once the value of the card is transmitted to the gaming device, the value is added to the player credits at step 70.

After the player has been credited with credits available for play, the player is presented with a game, places a wager, and initiates the game at step 72. Optionally, the gaming device can determine if player tracking (using a player tracking system) has been started at decision 74. If player tracking has been started, or if no player tracking is enabled, the gaming device proceeds to determine a game outcome at step 78. If player tracking is enabled, and tracking has not been initiated, the gaming device may initiate tracking at step 76 before going on to determine the game's outcome at step 78.

Player tracking can be integrated with cashless device. Player tracking may also be independent from the cashless device processes. For example, a player could swipe his or her tracking card prior to inserting a cashless device into a gaming machine. The player tracking system could provide the cashless device system with any information needed to determine whether the player is entitled to an additional prize.

If the game outcome of step 78 is determined at decision 80 to be a wining event, the prize won by the player is added to the player's credits at step 82. If the game outcome is not a winning event, the amount of the wager is subtracted from the player's credits at step 84. At decision 86, the player can then either choose to play another game, in which case the player will once again be presented with a game at step 72, or can choose to cash out. If the player chooses to cash-out, tracking, if enabled, is stopped at step 88 and the gaming machine enters the cash-out process at step 90.

Cash out process 90 is shown in detail in FIG. 3. In decision 122, the player may choose between obtaining a cash-out for currency, usually dispensed in coins, or may choose to cash-out via a cashless device. It should be noted that it is not necessary to provide the player with this choice for all embodiments of the invention. For example, even if the player is only allowed to cash-out on a cashless device, it may still be desirable only have the player cash-out amounts over a certain value, for example.

In one embodiment, if the player chooses to cash-out for currency, the cash-out process takes place normally at step 124. Preferably this will be by the gaming machine dispensing the appropriate number of coins. If the player has chosen to cash-out via a cashless device in decision 122, the gaming machine preferably checks to see if the player is entitled to an additional award (such as those previously described).

For example, if the gaming proprietor wishes, the player can be awarded a prize, including the chance to obtain an item of value, in return for cashing-out using a cashless device. If this prize is available at decision 126, the machine determines what, if any, prize the player is entitled in step 128. The machine then proceeds to determine if any other prizes are available. If the proprietor has chosen not to award a prize merely for cashing-out with a cashless device, the device may proceed to determine if the player is entitled to any other awards.

The player may be provided with a prize for cashing-out amounts over a certain value using a cashless device at decision 130. If this award has been enabled, the gaming machine checks in decision 132 to see whether the player has cashed out an amount over a threshold amount using their cashless device. If the threshold has been met or exceeded, the player is awarded a prize in step 134, which may include a chance to receive an item of value. Once any prize has been awarded, if the threshold has not been met, or if the minimum cash-out prize has not been enabled, the gaming machines goes on to determine whether the player is entitled to any other prizes.

The player can be awarded a prize if a threshold value has been wagered at decision 136. If this type of award is enabled, the gaming machine proceeds in decision 138 to determine whether the player tracking information shows that the player has wagered at least a threshold amount. If the amount is met, the player is awarded a prize in step 140. If the amount is not met, if the award is not enabled, or once the prize, including the chance at receiving an item of value, is awarded, the game again proceeds to determine whether the player is entitled to any other prizes.

With reference now to FIG. 4, the player can be awarded a prize for playing a game for a certain amount of time. Decision 160 checks to see if this prize event is available. If so, the gaming machine checks the player tracking information to determine the length of time the player has been playing one or more gaming devices in decision 162. The gaming device then determines what, if any, prize the player is entitled in step 164, awards any prize in step 166, and then proceeds to determine if any other prize qualifying events are enabled. If the minimum time award is not activated in decision 160, the gaming device may proceed to determine if any other prize qualifying events are available.

The player may be awarded a prize if a minimum amount wagered has been lost on one or more gaming devices. Decision 170 checks to see if this prize qualifying event is activated. If so, the gaming machine will check in decision 172 to see if a threshold amount has been lost and then awards a prize in step 174. The prize can include a chance at receiving an item of value. If the threshold is not met, the event has not been activated, or after any prize has been awarded, the gaming machine may proceed to determine whether any other prize qualifying events are available.

Those of skill in the art will recognize that the above steps can occur in a different sequence, that different steps can be included, and the certain steps can be omitted with the process still falling within the scope of the present invention.

Once the prize qualifying events have been checked, the gaming machine preferably completes the cash-out process. In decision 176, the machine may check to see whether a cashless device was used to initiate the gaming session. If not, the gaming machine may check in decision 180 to see if it is to issue a cashless device, such as a voucher. If a cashless device is to be issued, the gaming machine, in step 182, preferably directs a cashless device to be generated and issued to the player. Alternatively, if a cashless device is not to be issued, the gaming device could establish a cashless account for the player in step 184 and store the value of the player's credit without issuing a cashless device to the player. For example, the player could be shown an account number and/or a personal identification number (PIN) that can be used to access the player's account.

In decision 176, if the gaming device determines that a cashless device was used to initiate the gaming session, the gaming device then determines in decision 186 whether a value is stored on the cashless device. If value is stored on the cashless device, the gaming device preferably updates the value stored on the cashless device in step 190 and then issues the cashless device to the player in step 192.

In decision 186, if value is not stored directly on the cashless device, the gaming device preferably updates a remotely stored value associated with the cashless device in step 188.

CONCLUSION

Although the description above contains many specifications, these should not be construed as limiting the scope of the invention but as merely providing illustrations of some presently preferred embodiments of this invention. Thus, the scope of the invention should be determined by the appended claims and their legal equivalents rather than by the examples given.

What is claimed is:

1. A method comprising, not necessarily in the order shown:
- (A) providing at least one gaming device capable of presenting a game to a player and recording the value of a cashless device;
- (B) providing a cashless device;
- (C) permitting a player to play the gaming device;
- (D) recording the value of the cashless device;
- (E) redeeming at least a portion of the value of the cashless device; and
- (F) awarding the player an additional prize when the value redeemed exceeds a predetermined qualifying amount.

2. The method of claim 1 wherein the cashless device comprises a voucher.

3. The method of claim 1 wherein the cashless device comprises a ticket.

4. The method of claim 1 wherein the cashless device comprises a card.

5. The method of claim 1 further comprising transferring the value of the cashless device from the gaming device to a redemption location.

6. The method of claim 1 wherein the additional prize comprises a cash prize.

7. The method of claim 6 further comprising determining the value of the cash award using a random number generator.

8. The method of claim 6 wherein the cash prize comprises a percentage of the redeemed value.

9. The method of claim 8 further comprising determining the percentage of the redeemed value using a random number generator.

10. The method of claim 8 wherein the percentage is determined by a gaming operator.

11. The method of claim 1 wherein the additional prize comprises a chance at winning a prize having a value.

12. The method of claim 11 wherein the prize having a value comprises cash.

13. The method of claim 11 wherein the prize having a value comprises game play credits.

14. The method of claim 11 wherein the prize having a value comprises merchandise.

15. The method of claim 11 wherein the prize having a value comprises a service.

16. The method of claim 1 wherein the additional award comprises a non-cash prize.

17. The method of claim 16 wherein the non-cash prize comprises a good.

18. The method of claim 16 wherein the non-cash prize comprises a service.

19. The method of claim 1 wherein the additional prize comprises play on a game of chance.

20. The method of claim 19 wherein the game of chance is played on a slot machine.

21. The method of claim 19 wherein the game of chance is activated when the cashless device is redeemed.

22. A method for providing a player an incentive to redeem winnings using a cashless device, comprising, but not necessarily in the order shown:
- (A) providing a wagering game to a player;
- (B) allowing the player to transfer value to the wagering game;
- (C) recording the value transferred by the player to the wagering game;
- (D) presenting a game to the player;
- (E) allowing the player to place a wager;
- (F) playing the game;
- (G) determining whether the result of the game is a winning event or a losing event;
- (H) updating the recorded value by adding or subtracting from the recorded value depending on whether the result of the game was a winning or losing event;
- (I) allowing the player to cash-out at least a portion of the updated recorded value; and
- (J) triggering an award event if the cash-out is made using a cashless device, the award event awarding the player a prize.

23. The method of claim 22 wherein the award event is triggered if the player cashes-out the updated recorded value on a cashless device.

24. The method of claim 22 further comprising setting at least one qualifying cash-out value.

25. The method of claim 24 wherein the qualifying cash-out value comprises a fixed amount.

26. The method of claim 24 wherein the qualifying cash-out value is determined by the amount wagered by the player.

27. The method of claim 26 further comprising tracking how much a player wagers over a plurality of rounds of game play.

28. The method of claim 27 wherein the qualifying cash-out value is based on the amount wagered by the player over a plurality of rounds of game play.

29. The method of claim 24 further comprising tracking the amount of time the player spends playing the game.

30. The method of claim 29 wherein the qualifying cash-out value is based on the amount of time the player spends playing the game.

31. The method of claim 24 wherein the number of qualifying events the player may receive is limited to a certain number for a given time period.

32. The method of claim 23 wherein the prize comprises a fixed amount of currency.

33. The method of claim 23 wherein the prize comprises a random amount of currency.

34. The method of claim 23 wherein the prize is correlated to player characteristics.

35. The method of claim 23 wherein the prize comprises a good.

36. The method of claim 23 wherein the prize comprises a service.

37. The method of claim 23 wherein the prize comprises a chance at receiving a prize.

38. The method of claim 37 wherein the prize comprises play on a game of chance.

39. The method of claim 37 wherein the odds of receiving the prize are correlated to another factor.

40. The method of claim 39 wherein the factor comprises the value of the prize.

41. The method of claim 23 wherein the prize comprises entry in a gaming competition.

42. The method of claim 41 wherein the gaming competition comprises a tournament.

43. A system for allowing a gaming player to redeem winnings comprising:

(A) a gaming machine; the gaming machine comprising:

(a) a value acceptor, wherein the value acceptor is configured to accept currency or currency equivalents from a game player;

(b) a processing system, the processing system configured to present the player with a game of chance, the processing system configured to determine whether the player has won or lost the game of chance, the processing system configured to store the amount of value accepted from the game player, the processing system configured to update the value according to whether the player has won or lost the game of chance;

(B) a cashless gaming device, the cashless gaming device configured to store player information;

(C) a cashless gaming device cash-out system, the cash-out system in communication with the gaming machine processing system, the cash-out system comprising:

(a) a processor, the processor configured to compare information from the gaming machine processing system to a set of predefined instructions to determine whether the game player is entitled to a prize; and (b) a value dispenser, wherein the value dispenser is configured to dispense at least a portion of the value stored in the processing system to the game player.

44. The system of claim 43, the cashless gaming device cash-out system further comprising a prize indicator, the prize indicator indicating to the player any additional prize to which the player may be entitled.

45. The system of claim 44 wherein the prize indicator comprises a video screen.

46. The system of claim 44 wherein the prize indicator comprises a printed indicator.

47. The system of claim 43 wherein the cashless gaming device comprises printed indicia representing the value of the cashless gaming device.

48. The system of claim 43 wherein the cashless gaming device comprises machine readable identification indicia.

49. An apparatus for awarding a gaming player a reward for redeeming winnings without using a game based coin dispenser, comprising:

(A) a processor for reading information transferred from a cashless gaming device;

the processor comparing the information to a set of pre-set instructions to determine whether an additional prize should be awarded to a player;

(B) firmware or software containing the pre-set instructions;

(C) a cashless device reader, the cashless device reader reading information from a cashless device and inputting the information into the processor; and (D) player account information storage, the player account storage storing player information, the player account storage in communication with the processor.

50. The apparatus of claim 49 wherein the information comprises a value associated with the cashless device.

51. The apparatus of claim 49 wherein the information comprises player tracking information.

52. The apparatus of claim 51 wherein the player tracking information comprises information about the player's wagering history.

53. The apparatus of claim 51 wherein the player tracking information comprises information about the length of time the player has spent wagering on games of chance.

54. The apparatus of claim 49 wherein the information comprises an account identifier.

55. The apparatus of claim 49, wherein the processor further comprises a random number generator, the random number being used to determine whether the player is entitled to a prize.

* * * * *